United States Patent
Horiuchi et al.

(10) Patent No.: US 8,520,244 B2
(45) Date of Patent: Aug. 27, 2013

(54) RECORDING SYSTEM AND CONTROL METHOD FOR A RECORDING SYSTEM

(75) Inventors: Yukiharu Horiuchi, Chino (JP); Keigo Ejiri, Ikeda-machi (JP)

(73) Assignee: Seiko Epson Corporation, Tokyo (JP)

( * ) Notice: Subject to any disclaimer, the term of this patent is extended or adjusted under 35 U.S.C. 154(b) by 251 days.

(21) Appl. No.: 13/105,296

(22) Filed: May 11, 2011

(65) Prior Publication Data

US 2011/0279860 A1 Nov. 17, 2011

(30) Foreign Application Priority Data

May 14, 2010 (JP) ................................. 2010-112153

(51) Int. Cl.
*G06F 3/12* (2006.01)
*H04N 1/00* (2006.01)
*H04N 1/46* (2006.01)
*B41J 29/393* (2006.01)
*G01D 3/00* (2006.01)
*G01P 21/00* (2006.01)

(52) U.S. Cl.
USPC ......... 358/1.15; 358/1.13; 358/504; 358/406; 347/19; 702/108

(58) Field of Classification Search
USPC ................. 358/515, 521, 1.1–1.9, 406, 504; 347/19; 702/108
See application file for complete search history.

(56) References Cited

U.S. PATENT DOCUMENTS

| | | | | |
|---|---|---|---|---|
| 5,333,286 A | * | 7/1994 | Weinberger et al. | 714/47.2 |
| 5,485,246 A | * | 1/1996 | Hayashi et al. | 399/1 |
| 6,795,659 B2 | | 9/2004 | Uchida | |

FOREIGN PATENT DOCUMENTS

| | | |
|---|---|---|
| JP | 11-350271 A | 12/1999 |
| JP | 2000-222154 A | 8/2000 |
| JP | 2003-76228 A | 3/2003 |
| JP | 2006-137050 A | 6/2006 |

\* cited by examiner

*Primary Examiner* — Akwasi M Sarpong
*Assistant Examiner* — Ibrahim Siddo
(74) *Attorney, Agent, or Firm* — Nutter McClennen & Fish LLP; John J. Penny, Jr.; Michael P. Visconti, III (57) ABSTRACT

A system in which a recording device is connected to another device can test the functionality of the recording device and test the functionality of the system including the recording device at the same time. A recording system 1 causes the printer 3 to execute a test relating to the functionality of the printer 3 in response to operation of a test switch 49, store the test switch 49 operation count, and return the stored test switch 49 operation count in response to a request from the host computer 2. The host computer 2 requests the printer 3 to send the test switch 49 operation count, and runs a test related to the recording system 1 based on the operation count returned by the printer 3 in response to the request.

4 Claims, 5 Drawing Sheets

RECORDING SYSTEM AND CONTROL METHOD FOR A RECORDING SYSTEM

This application claims priority under 35 U.S.C. §119 to Japanese Patent Application No. 2010-112153 filed on May 14, 2010, the entire disclosure of which is expressly incorporated by reference herein.

BACKGROUND

1. Technical Field

The present invention relates to a recording system including a recording device and a recording control device, and to a method of controlling the recording system.

2. Related Art

Printers and other types of recording devices that record on a recording medium and can execute a print test when a switch provided on the recording device is operated are known from the literature. See, for example, Japanese Unexamined Patent Appl. Pub. JP-A-2003-76228.

When a recording control device that outputs data to be recorded and recording commands to the recording device is connected to the recording device, testing communication between the recording device and the recording control device is controlled by the recording control device. See, for example, Japanese Unexamined Patent Appl. Pub. JP-A-11-350271.

When a new recording device is set up, the functionality of the recording device is usually first tested alone by executing a print test, for example, and the functionality of the system including the recording control device and the recording device is tested using a communication test, for example, to confirm if the recording device and the recording control device are both operating normally. These tests typically include operating a switch on the recording device causing the recording device to output a predetermined printout that is then visually evaluated by the operator to check the functionality of the recording device itself, and a communication test in which the connected recording control device is operated to send a particular print command to the recording device and check if the recording device outputs the printout specified by this command.

However, the recording device and recording control device are not necessarily together, and may be located in remote locations or different rooms connected by a communication line. In order for one person to operate and check the test results of both the recording device and the recording control device in this situation requires that person to move between the different locations, and testing the functionality of the recording device and the functionality of the system that includes the recording device together (one after the other) is not easy.

SUMMARY

At least of one embodiment of the present invention enables easily testing both recording device functionality and the functionality of a system including a recording device that is connected to a recording control device or other device.

A first aspect of the invention is a recording system comprising a recording device that records on a recording medium, and a recording control device that is communicably connected to the recording device, wherein: the recording device includes a test control unit that detects a first operation instructing test (self-test) execution from operation of an operating unit, and executes a test related to a function of the recording device, an operation information storage unit that stores operation information related to operation of the operating unit, and a transmission unit that sends operation information for the operating unit stored in the operation information storage unit in response to a request from the recording control device; and the recording control device includes a system test control unit that requests the recording device to send operation information for the operating unit, and executes a test of the recording system based on second operation information that is related to a second operation included in the operation information sent from the recording device in response to the request.

In a recording system connecting a recording device and a recording control device, a test of recording device functionality is run when the operator performs a first operation of an operating unit disposed to the recording device in order to test the functionality of the recording device.

When the operator performs a second operation of the operating unit of the recording device to test system functionality, the recording device sends second operation information relating to this second operation to the recording control device, and triggered by detecting this second operation information in the operation information, the recording control device performs a test of a recording system function, such as sending a command to the recording device to produce specific output and causing the recording device to output the specific printout.

Both tests can thus be performed as a result of the operator operating only the operating unit of the recording device, and the operator can evaluate the test result from the operation of the recording device and the output result.

A test of recording device function and a test of the function of the system including the recording device can thus both be performed as a result of a simple operation on the recording device side. In addition, the operator can run tests including a communication test and get the test results at the same location by operating only the recording device. The recording device and the recording control device can therefore be located remotely to each other and the tests can be performed without the operator needing to change location.

Furthermore, because the recording device may also store operation information such as the number of times the operating unit was operated (operation count), the type and location of the operated operating unit, the length of time of or the time between operations of the operating unit, and the recording control device detects operation of the operating unit based on this information about operation of the operating unit, the recording device does not need to inform the recording control device every time the operating unit is operated.

In addition, if the second operation information specifies a test of the recording system, the recording system test is executed only when the operation information from the recording device is interpreted and the second operation information is detected because a indication of the recording system test is stored in the recording control device. As a result, a recording system test can be performed easily even when using a simple recording device that only has a function for reporting operation information and other status information to the recording control device in addition to a recording function. Furthermore, because these tests can be started by operating only the recording device, testing is simple when the recording control device is in a location far from the recording device.

In a recording system according to another aspect of the invention, the recording control device preferably includes a control-side operation detection unit that compares the past operation information including past sent from the recording device in response to the operation information transmission request, and operation information including past that was previously sent from the recording device, and detects the second operation information; and the system test control unit executes a test related to the recording system when the second operation information is detected by the control-side operation detection unit.

The recording control device in this aspect of the invention can reliably detect operation of the operating unit based on change in the operation information of the operating unit stored by the recording device.

In a recording system according to another aspect of the invention, the control-side operation detection unit of the recording control device requests operation information for the operating unit from the recording device at a regular interval after the operating system of the recording control device starts.

In this aspect of the invention, because the recording control device requests and gets the operation information of the operating unit from the recording device at a regular interval after the operating system of the recording control device starts, the recording control device can quickly detect operation of the operating unit and run the test without performing an operation timed to operation of the operating unit.

In a recording system according to another aspect of the invention, the recording control device includes a storage unit that stores the operation information sent from the recording device; and the control-side operation detection unit detects the second operation information by comparing the operation information including past sent from the recording device with the previously sent operation information including past stored in the storage unit.

The recording control device in this aspect of the invention can reliably detect operation of the operating unit based on change in the operation information of the operating unit stored by the recording device.

In a recording system according to another aspect of the invention, the system test control unit of the recording control device executes a test including communicating with the recording device as a test related to the recording system.

This aspect of the invention enables also testing communication with a recording control device located in a place remote from the recording device based on an operation performed at the recording device.

In a recording system according to another aspect of the invention, the recording device is a printing device that forms images on the recording medium by means of a printhead; and the test control unit executes a test printing operation using the printhead when the first operation is detected.

This aspect of the invention enables performing a print test using the printhead as the test of the recording device.

Another aspect of the invention is a control method for a recording system comprising a recording device that records on a recording medium, and a recording control device that is communicably connected to the recording device, including steps of: the recording device detecting a first operation instructing test execution from operation of an operating unit, executing a test related to the recording device, storing operation information related to operation of the operating unit, and sending the stored operation information for the operating unit in response to a request from the recording control device; and the recording control device requesting the recording device to send operation information for the operating unit, and executing a test of the recording system based on second operation information that is related to a second operation included in the operation information sent from the recording device in response to the request.

In a recording system connecting a recording device and a recording control device, a test of recording device functionality is run when the operator performs operates an operating unit disposed to the recording device in order to test the functionality of the recording device.

When the operator performs a second operation of the operating unit of the recording device to test system functionality, the recording device sends second operation information relating to this second operation to the recording control device, and triggered by detecting this second operation information in the operation information, the recording control device performs a test of a recording system function, such as sending a command to the recording device to produce specific output and causing the recording device to output the specific printout.

Both tests can thus be performed as a result of the operator operating only the operating unit of the recording device, and the operator can evaluate the test result from the operation of the recording device and the output result.

A test of recording device function and a test of the function of the system including the recording device can thus both be performed as a result of a simple operation on the recording device side. In addition, the operator can run tests including a communication test and get the test results at the same location by operating only the recording device. The recording device and the recording control device can therefore be located remotely to each other and the tests can be performed without the operator needing to change location.

Furthermore, because the recording device stores information about operation of the operating unit, and the recording control device detects operation of the operating unit based on this information about operation of the operating unit, the recording device does not need to inform the recording control device every time the operating unit is operated.

In addition, if the second operation information specifies a test of the recording system, the recording system test is executed only when the operation information from the recording device is interpreted and the second operation information is detected because the indication of the recording system test is stored in the recording control device. As a result, a recording system test can be performed easily even when using a simple recording device that only has a function for reporting operation information and other status information to the recording control device in addition to a recording function. Furthermore, because these tests can be started by operating only the recording device, testing is simple when the recording control device is in a location far from the recording device.

In a control method for a recording system according to another aspect of the invention, the recording control device compares the operation information including past sent from the recording device in response to the operation information transmission request, and operation information including past that was previously sent from the recording device, and detects the second operation information, and executes a test related to the recording system when the second operation information is detected.

This aspect of the invention can reliably detect operation of the operating unit based on change in the operation information of the operating unit stored by the recording device.

In a control method for a recording system according to another aspect of the invention, when the operating system of the recording control device starts, the recording control device requests operation information for the operating unit from the recording device at a regular interval.

In a control method for a recording system according to another aspect of the invention, the recording control device stores the operation information sent from the recording device, and detects the second operation information by comparing the operation information including past sent from the recording device with the previously sent operation information including past stored in the storage unit.

In a control method for a recording system according to another aspect of the invention, a test including communicating with the recording device is executed as a test related to the recording system.

In a control method for a recording system according to another aspect of the invention, the recording device is a printing device that forms images on the recording medium by means of a printhead, and executes a test printing operation using the printhead when the first operation is detected.

EFFECT OF AT LEAST OF ONE EMBODIMENT OF THE INVENTION

At least of one embodiment of the invention enables performing both a test related to the function of the recording device and a test of the function of the system including the recording device when the operator performs a simple operation on the recording device.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Figure 1:
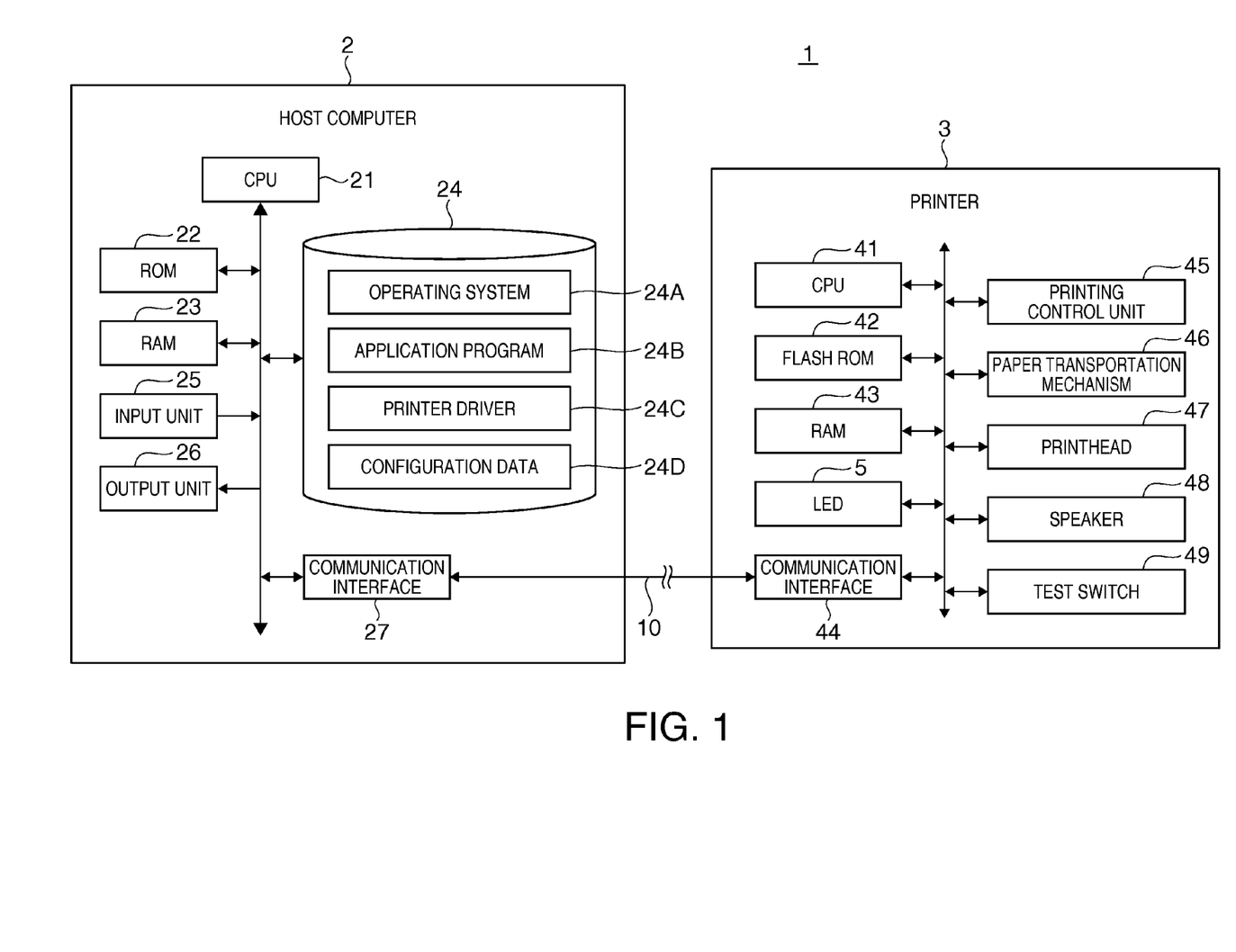
FIG. 1 is a block diagram showing the electrical configuration of a recording system according to a preferred embodiment of the invention.

FIG. 1 is a block diagram showing the electrical configuration of a recording system 1 according to this embodiment of the invention.

The recording system 1 includes a printer 3 and a host computer 2 communicably connected to each other through a communication line 10. The printer 3 is an example of a recording device that prints (records) markings such as text and images on a cut sheet or continuous sheet medium made of coated paper, plastic film, or other recording medium. The host computer 2 is an example of a recording control device that controls the printer 3 to print.

Note that this embodiment shows the host computer 2 and printer 3 connected 1:1, but the number of printers 3 that may be connected to a single host computer 2 is not limited and a plurality of printers 3 may be connected to the host computer 2. A single printer 3 may also be connected to a plurality of host computers 2.

The communication line 10 may be a communication cable or wireless circuit connecting the host computer 2 and printer 3 1:1, or a wired or wireless LAN or wide-area network using public telecommunication lines connecting a plurality of printers 3 to one host computer 2.

The recording method of the printer 3 is also not limited. In this embodiment of the invention, for example, the printer 3 is an inkjet printer that records markings such as text or images by discharging plural colors of ink from a printhead onto the recording medium.

As shown in FIG. 1, the host computer 2 mainly includes a CPU 21, nonvolatile memory such as ROM 22, volatile memory such as RAM 23, a storage unit 24, an input unit 25 connected to a keyboard or other input device, an output unit 26 connected to a display or other output device, and a communication interface 27. The host computer 2 controls the printer 3 by outputting commands and print data to the printer 3 through the communication interface 27 while the CPU 21 runs the operating system 24A, application program 24B, and printer driver 24C stored in the storage unit 24. The host computer 2 sends print jobs including print execution commands and print data to the printer 3 for printing. The host computer 2 also sends a timer reset command described below to the printer 3 at regular intervals.

When host computer 2 power turns on, the operating system 24A is activated and an application program 24B for testing the recording system 1 starts.

The main parts of the printer 3 include a CPU 41, rewritable nonvolatile memory such as flash ROM 42, volatile memory such as RAM 43, a communication interface 44, a printing control unit 45 that records images by ejecting ink onto the recording paper (recording medium), a paper transportation mechanism 46, a printhead 47, a speaker 48, and an LED 5.

The printer 3 receives print data by communicating with the host computer 2 through the communication interface 44 while the CPU 41 executes firmware stored in flash ROM 42. Based on the received commands and print data, the printing control unit 45 issues a receipt or coupon, for example, by controlling the paper transportation mechanism 46 to convey paper and driving the printhead 47 to print on the paper. The printer 3 also reports information visually or audibly to the user by causing the LED 5 to light steady or blink, or the speaker 48 to sound a buzzer, play a melody, or output spoken guidance.

The printer 3 also has a test switch 49 as an operating unit. The test switch 49 is a switch for telling the printer 3 to run the print test, and is disposed with the LED 5 in an operating panel (not shown in the figure) disposed at the front of the printer 3 case. When the test switch 49 is operated, the CPU 41 of the printer 3 controls printing a nozzle check pattern to visually check for clogging of the printhead 47.

The printer 3 also has a function for counting and storing an operation count indicating the number of times the test switch 49 is operated, and enables the host computer 2 to detect operation of the test switch 49 based on the test switch 49 operation count.

Figure 2:
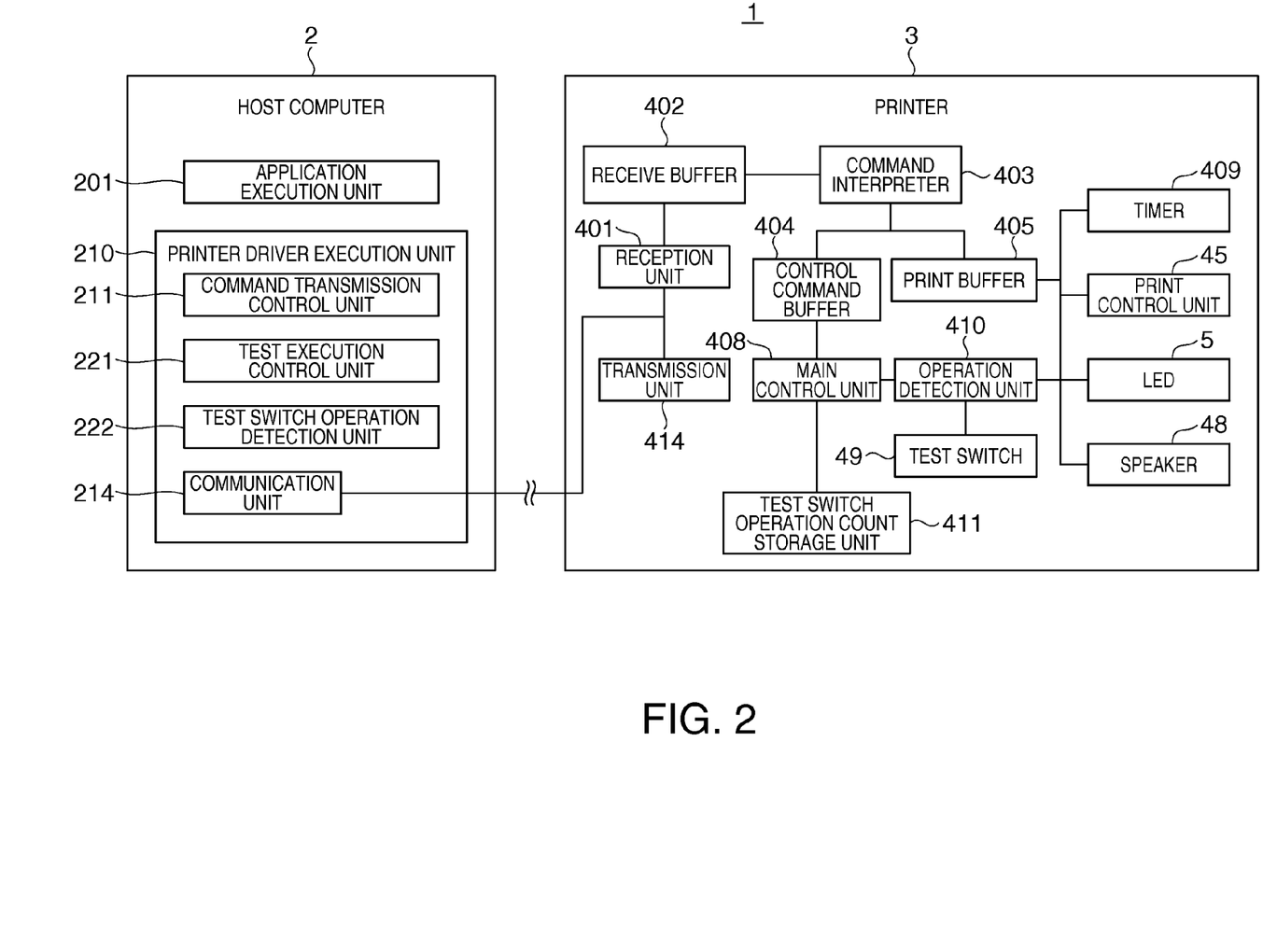
FIG. 2 is a function block diagram of the host computer and printer.

FIG. 2 is a function block diagram showing the functional configuration of the host computer 2 and the printer 3 rendering this recording system 1. The units shown in FIG. 2 are rendered by the cooperation of software and hardware resulting from the CPU 21 of the host computer 2 (FIG. 1) running programs stored in the storage unit 24, and the CPU 41 of the printer 3 executing programs stored in flash ROM 42.

As shown in FIG. 2, the printer 3 has a reception unit 401 that receives commands and print data sent from the host computer 2, and a receive buffer 402 that temporarily stores the commands and print data received by the reception unit 401. The data received in the receive buffer 402 is interpreted by the command interpreter 403, command data is sent to the control command buffer 404, and print data is sent to the print buffer 405, by DMA transfer.

Print data temporarily stored in the print buffer 405 is converted by a data conversion process, resulting in dot pattern data corresponding to the nozzle configuration of the printhead 47 being generated and stored in the print buffer 405. The control command data temporarily stored in the control command buffer 404 is read by the main control unit 408, and processes are executed according to the control commands, such as a paper cut command.

When the operation detection unit 410 of the printer 3 detects an operation such as pressing the test switch 49 once (first operation), the main control unit 408 (test control unit) converts image data for printing a nozzle check pattern to produce and store the corresponding dot pattern data in the print buffer 405. The dot pattern data stored in the print buffer 405 is read by the printing control unit 45, and a print test (a self-test of the printer 3) is executed as controlled by the printing control unit 45.

If the operation detection unit 410 detects the test switch 49 being pressed plural times (second operation), the main control unit 408 controls storing the operation count (operation information) of the test switch 49 in the test switch operation count storage unit 411 (operation count storage unit).

The test switch operation count storage unit 411 is a storage area reserved in flash ROM 42 (FIG. 1) that stores the cumulative operation count of the test switch 49, and increments the count (+1) each time the operation detection unit 410 detects operation of the test switch 49. The test switch operation count storage unit 411 does not necessarily need to be a counter that maintains a multiple digit count. More particularly, the test switch operation count storage unit 411 simply needs to be able to acquire at least two states, and could be a storage area storing a flag that changes between 0 and 1 each time the operation detection unit 410 detects operation of the test switch 49.

Figure 3:
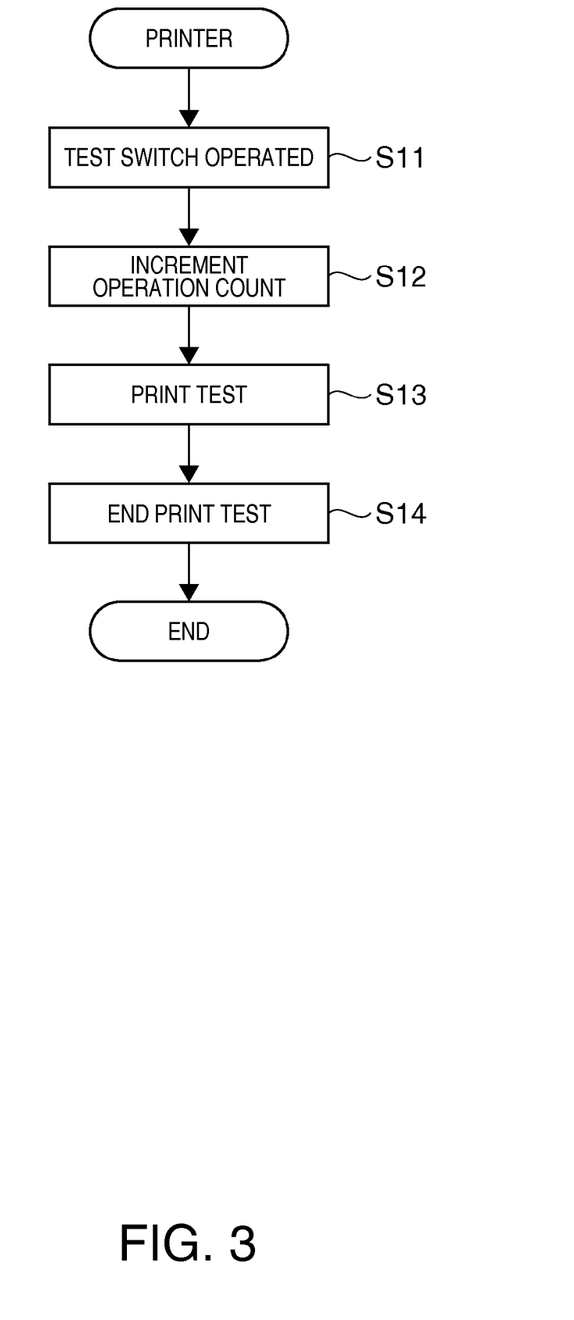
FIG. 3 is a flow chart of printer operation.

FIG. 3 is a flow chart of printer 3 operation.

As shown in FIG. 3, the operation detection unit 410 of the printer 3 detects when the test switch 49 is operated (step S11), and the main control unit 408 controls incrementing the operation count of the test switch 49 stored in the test switch operation count storage unit 411 (step S12). The printer 3 then starts the print test and prints the nozzle check pattern (step S13), and returns to the normal standby state when the print test ends (step S14).

As shown in FIG. 2, the host computer 2 also renders the basic functions of the host computer 2 by running the operating system 24A stored in the storage unit 24. The host computer 2 includes a application execution unit 201 that runs the application program 24B stored in the storage unit 24, a printer driver execution unit 210 that runs the printer driver 24C, and a communication unit 214 that communicates with the printer 3 to send print jobs and commands.

The printer driver execution unit 210 includes a command transmission control unit 211, test execution control unit 221, test switch operation detection unit 222, and communication unit 214 that communicates with the printer 3.

The command transmission control unit 211 generates and sends to the printer 3 by means of the communication unit 214 print jobs and control commands for printing data processed by the application execution unit 201 based on data output by the application execution unit 201 running an application program.

The test execution control unit 221 (system test control unit) runs a communication test with the printer 3.

The test switch operation detection unit 222 (control-side operation detection unit) detects operation of the test switch 49 disposed to the printer 3.

The communication unit 214 sends commands to the printer 3 and receives information from the printer 3 according to instructions from the API (application programming interface) communicated through a port (a LAN port in this embodiment of the invention) for communicating with the printer 3.

When the application execution unit 201 outputs a print command and print data, the command transmission control unit 211 generates a print job including a print command and the print data, and sends the generated print job to the printer 3 by means of the communication unit 214.

The test execution control unit 221 generates and sends test commands to the printer 3 by means of the communication unit 214 as controlled by the application execution unit 201, and tests communication between the host computer 2 and printer 3 (sending a command for a print test) based on whether or not a response command from the printer 3 is received within a predetermined time.

The test switch operation detection unit 222 generates and sends to the printer 3 by means of the communication unit 214 a status request command requesting the printer 3 to return the operation count of the test switch 49. The status request command is commonly used to request status information reporting the operating status of the printer 3, but the status request command in this embodiment of the invention is defined as a command that also requests the test switch 49 operation count.

When the printer 3 receives the status request command sent by the test switch operation detection unit 222, the main control unit 408 reads the test switch 49 operation count stored in the test switch operation count storage unit 411, and sends the operation count together with status information reporting the current operating state (such as standby, sleep, on-line, or off-line) of the printer 3 to the host computer 2.

The printer 3 can return only status information as the response to the status request command, and when only status information is sent the host computer 2 receives and processes the status information as not containing the operation count.

The test switch operation detection unit 222 of the host computer 2 sends the status request command at a predetermined interval (such as every 3 seconds) by means of the communication unit 214, and the operation count is sent with the status information each time from the printer 3.

The test switch operation detection unit 222 of the host computer 2 acquires the operation count added to the status information sent from the printer 3, and detects operation of the test switch 49 by comparing this count with the previously sent count. If the previously received count and the current count are not the same (the second operation information is detected), the test switch 49 was operated.

Operation of the test switch 49 can thus be easily and accurately determined based on whether or not the counts are the same (match). Furthermore, because the count changes each time the test switch 49 is operated and clearly detecting if the counts are the same is sufficient, the test switch operation count storage unit 411 can be any configuration enabling discriminating between at least two states (that is, a configuration that can store 1 data bit). However, because the test switch 49 could be operated multiple times in the interval between when the host computer 2 sends the status request command, the test switch operation count storage unit 411 can preferably at least approximately 5 or 10 values so that more operating status can be discriminated and operation of the test switch 49 can be detected more reliably.

The application execution unit 201 periodically outputs a printer status request to the test switch operation detection unit 222 to acquire the printer 3 status. The test switch operation detection unit 222 outputs the status information received from the printer 3 as the response to the printer status request.

When operation of the test switch 49 is detected based on the test switch 49 operation count added to the status information received from the printer 3, the test switch operation detection unit 222 adds and outputs information indicating operation of the test switch 49 to the status information sent to the application execution unit 201.

The application execution unit 201 controls the test execution control unit 221 and executes a communication status test with the printer 3 when information indicating operation of the test switch 49 is added to the status information input from the test switch operation detection unit 222.

Figure 4:
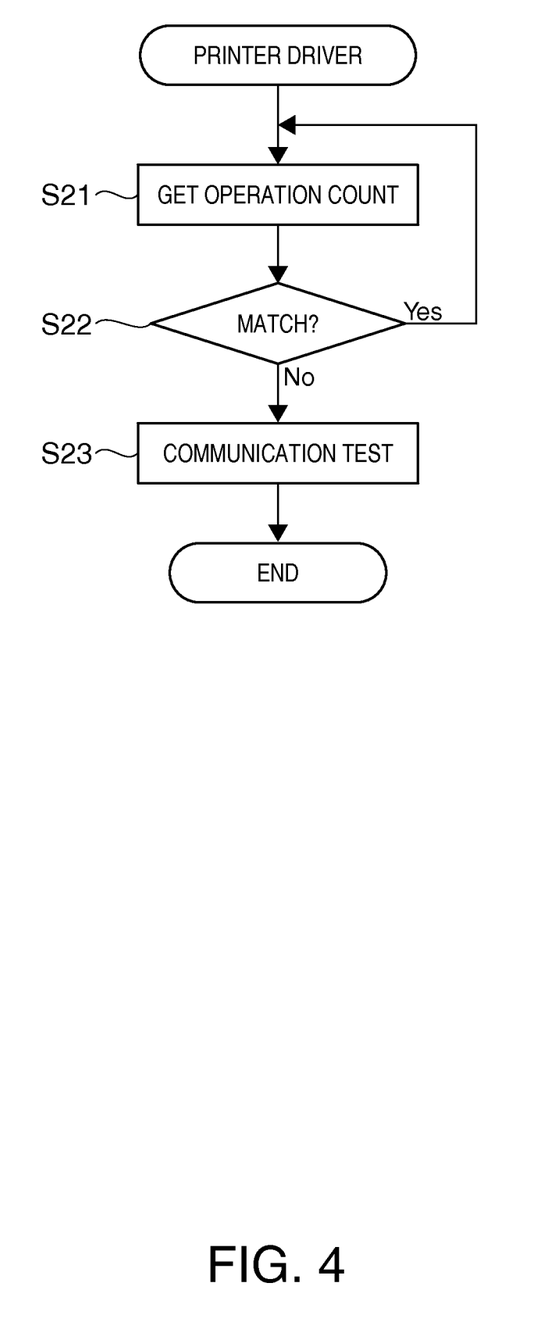
FIG. 4 is a flow chart of a process executes by the printer driver.

FIG. 4 is a flow chart of the process run by the printer driver execution unit 210.

As shown in FIG. 4, when the printer driver execution unit 210 sends a status request command to the printer 3 by means of the test switch operation detection unit 222, and the printer 3 returns status information in response to this status request command, the printer driver execution unit 210 acquires the test switch 49 operation count that was sent with the status information (step S21).

The test switch operation detection unit 222 determines if the acquired operation count matches the operation count contained in the previously received status information (step S22), and returns to step S21 if the values match. If the values do not match (second operation information is detected), the test switch operation detection unit 222 determines the test switch 49 was operated, and runs a communication test by means of the test execution control unit 221 (step S23).

Alternatively, each time the test switch operation detection unit 222 acquires the test switch 49 operation count (step S21), the printer driver execution unit 210 could store the acquired operation count in a storage area provided in storage unit 24 (FIG. 1), for example, and after acquiring the test switch 49 operation count compare the acquired count with the stored count to determine coincidence. In this case, the stored count can be updated each time the same process executes.

The test switch 49 of the printer 3 is, for example, operated once to print a nozzle check pattern when the printer 3 is newly installed. When the printer 3 is newly installed, the host computer 2 and printer 3 were just connected and the host computer 2-printer 3 communication test is therefore preferably run, but this test is executed by a function of the host computer 2. Therefore, when the nozzle check pattern of the printer 3 is printed and a communication test is also performed, the test switch 49 must be operated on the printer 3 and the input unit 25 of the host computer 2 must then be operated.

The printer 3 in this recording system 1 can be installed at a location remove from the host computer 2. For example, the host computer 2 and printer 3 may be located on different floors of the same building, or the printer 3 and host computer 2 could be located remotely from each other using a dedicated line or public telecommunication network as the communication line 10. When the host computer 2 and printer 3 are thus remote from each other, it is difficult for one person to operate both the host computer 2 and printer 3, and printing a nozzle check pattern on the printer 3 and testing communication with the host computer 2 cannot be done together.

In a recording system 1 according to this embodiment of the invention, the operating system 24A is activated when the host computer 2 power turns on, and an application program 24B for testing the recording system 1 is started.

This test application program 24B has a function for detecting operation of the test switch 49, and executes the communication test when operation of the test switch 49 is detected. The test operator can print the nozzle check pattern (run the self-test) and run the communication test by operating the test switch 49 of the printer 3 whether the host computer 2 and printer 3 are in proximity to each other or in remote locations.

Figure 5:
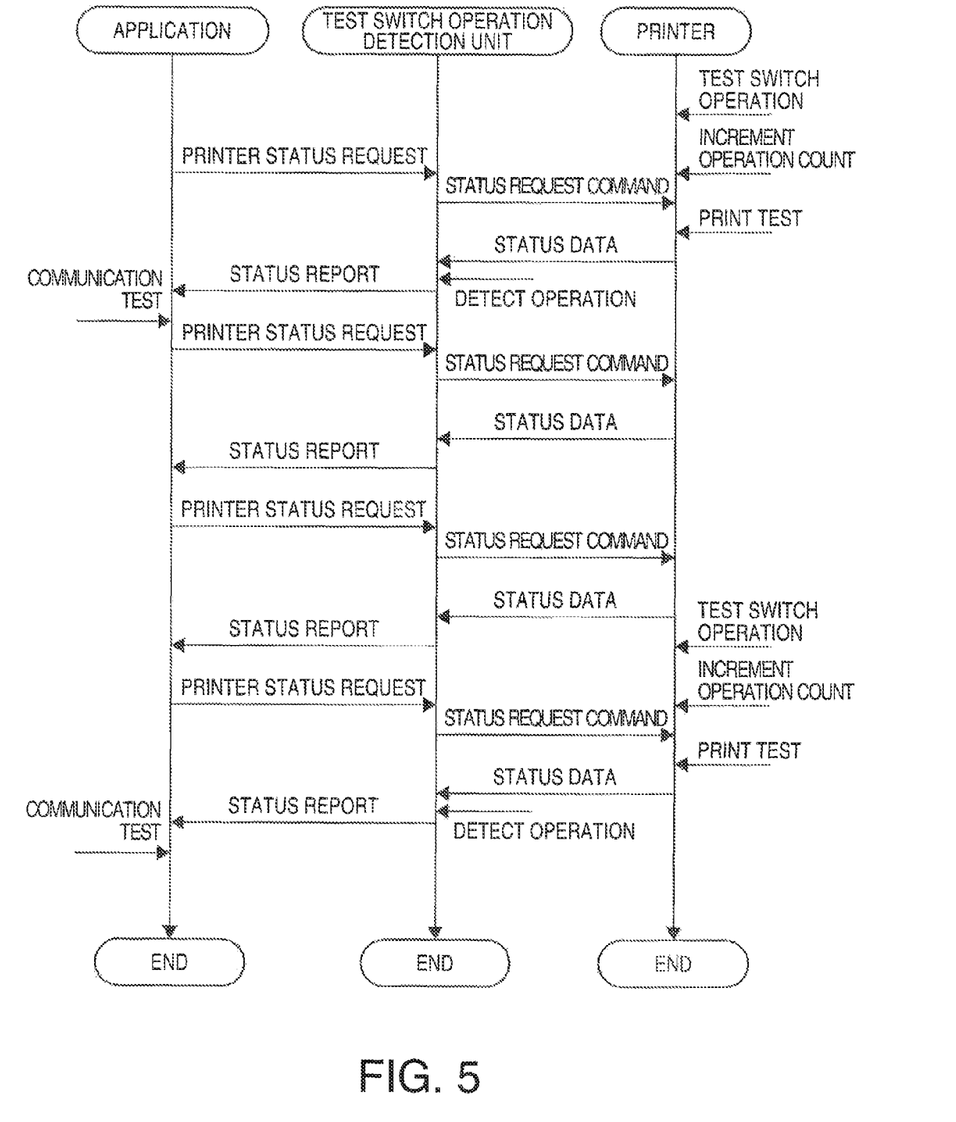
FIG. 5 shows an example of the operating sequence of the recording system.

FIG. 5 is an example of the operating sequence of the recording system 1. Column (A) in the figure shows the operation of the application execution unit 201, (B) shows the operation of the test switch operation detection unit 222, and (C) shows the operation of the printer 3.

As shown in FIG. 5, the printer 3 increments the operation count stored in the test switch operation count storage unit 411 and executes the print test each time the test switch 49 is operated.

The test switch operation detection unit 222 sends a status request command to the printer 3 at a predetermined interval. The printer 3 receiving this status request command adds the count stored in the test switch operation count storage unit 411 to the status information indicating the current operating status, and outputs to the test switch operation detection unit 222. If the returned count matches the previously received count, the test switch operation detection unit 222 detects that the test switch 49 was operated.

The application execution unit 201 outputs a printer status request command to the test switch operation detection unit 222 at a preset interval to get the printer 3 status. In response to this status request command, the test switch operation detection unit 222 outputs the printer 3 status information, and the application execution unit 201 refers to the status information to determine if the printer 3 is operating normally. If information indicating that the test switch 49 was operated is added to the status information output by the test switch operation detection unit 222, the application execution unit 201 controls the test execution control unit 221 and runs a communication test with the printer 3.

A recording system 1 according to this embodiment of the invention is a recording system 1 including a printer 3 and a host computer 2 communicably connected to the printer 3.

The printer 3 detects operation of a test switch 49 by means of a operation detection unit 410, executes a print test to test printer 3 functionality as controlled by the main control unit 408 in response to the test switch 49 being operated, stores the test switch 49 operation count in a test switch operation count storage unit 411, increments the operation count stored in the test switch operation count storage unit 411 when the operation detection unit 410 detects that the test switch 49 was operated, and in response to a request from the host computer 2 outputs the test switch 49 operation count stored in the test switch operation count storage unit 411.

The host computer 2 asks the printer 3 to send the test switch 49 operation count using a function of the test switch operation detection unit 222, and based on the operation count returned by the printer 3 in response to this request tests the communication state, which is a test of the recording system 1, by means of the test execution control unit 221.

As a result, the recording system 1 can execute both a test of printer 3 functionality and a test of the system including the printer 3 by means of a simple operation. Both tests can also be started based only on operation of the test switch 49 disposed to the printer 3 even when the host computer 2 and the printer 3 are remote from each other.

In addition, when the printer 3 is requested to send the test switch 49 operation count by means of a function of the test switch operation detection unit 222, the test switch operation detection unit 222 of the host computer 2 compares the operation count sent from the printer 3 in response to this request with the operation count previously sent from the printer 3 and detects operation of the test switch 49. Operation of the test switch 49 can therefore be detected based on change in the operation count of the test switch 49.

In addition, because the printer 3 stores the operation count of the test switch 49, and the host computer 2 detects operation of the test switch 49 based on this test switch 49 operation count, the printer 3 does not need to notify the host computer 2 every time the test switch 49 is operated. As a result, operation of the test switch 49 of a printer 3 can be reliably detected by the host computer 2 even when a printer 3 with a simple design is used.

Because the test switch operation detection unit 222 of the host computer 2 in this recording system 1 requests the test switch 49 operation count from the printer 3 at a regular interval, operation of the test switch 49 can be quickly detected and a test performed without executing an operation timed to operation of the test switch 49.

In addition, because the host computer 2 stores the operation count sent from the printer 3 in the storage unit 24, and the test switch operation detection unit 222 detects operation of the test switch 49 by comparing the operation count sent from the printer 3 with the operation count that was previously sent and stored, the host computer 2 can reliably detect operation of the test switch 49 based on change in the test switch 49 operation count stored by the host computer 2.

It will be obvious to one with ordinary skill in the related art that the foregoing embodiment is but one example of the invention, and the invention is not limited thereto. For example, the printer 3 in the foregoing embodiment test prints a nozzle check pattern as controlled by the main control unit 408, and the test execution control unit 221 of the host computer 2 controls running a communication test with the printer 3, but the invention is not so limited. For example, the print test of the printer 3 could be an operation that prints a list of particular parameter settings, or an operation that prints out the current operating status of the printer 3, or the total running time or number of lines printed by the printer 3.

In addition, the host computer 2 test could test the operating state of all printers 3 in the recording system 1, or the communication state and printing function could be tested simultaneously as a result of the host computer 2 controlling printing by the printer 3.

Yet further, if the test fails when the host computer 2 tests communication in the foregoing embodiment, the failure could be reported by causing the LED 5 to light steady or blink, printing out a message reporting the error, or outputting audio reporting that an error occurred, or a control signal could be sent from the printer 3 to another device connected to the printer 3, and the device that receives this control signal could output an appropriate error message.

Operation based on the operation count used as test switch 49 operation information is described by way of example in the foregoing embodiment, but the process could be executed using the length of time the test switch 49 is pressed or the interval between when the test switch 49 is pressed as this operation information. A plurality of test switches could also be used and the process could be based on the combination of plural test switches that are operated, or the test switch could be a touch panel switch and the process executes based on the combination of places that are operated on the touch panel switch. Based on this switch operation data, a test related to the functionality of the printer 3, and a test of the function of the recording system 1 including the printer 3, can also be selectively executed.

The printer 3 in the foregoing embodiment is described as being an inkjet printer, but the recording device to which the invention can be applied is not particularly limited as long as the device can record markings such as text or images. More particularly, the invention can also be applied to thermal printers that print on thermal roll paper using a line thermal head having heating elements, a dot impact printer, or a laser printer, for example. The invention can also be applied to printers that are incorporated into other devices.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording system comprising a recording device that records on a recording medium, and a recording control device that is communicably connected to the recording device, wherein:

the recording device includes
a test control unit that detects operation of an operating unit of the recording device, and executes a recording test related to the recording device in response to the detected operation of the operating unit, an operation information storage unit that stores operation information related to operation of the operating unit, and
a transmission unit that sends the operation information stored in the operation information storage unit to the recording control device in response to a request from the recording control device; and the recording control device includes
a control-side operation detection unit that requests the operation information from the recording device and detects second operation information by comparing the operation information received from the recording device to operation information previously received from the recording device and stored in the recording control device, and
a system test control unit that executes a communication test of the recording system when the control-side operation detection unit detects the second operation information,
wherein: the control-side operation detection unit requests the operation information at a regular interval after the operating system of the recording control device starts.

2. The recording system described in claim 1, wherein:
the recording device is a printing device that forms images on the recording medium by a printhead; and
the test control unit executes a test printing operation using the printhead when the operation of the operating unit is detected.

3. A control method for a recording system comprising a recording device that records on a recording medium, and a recording control device that is communicably connected to the recording device, comprising:

the recording device detecting operation of an operating unit of the recording device, executing a recording test related to the recording device in response to the detected operation of the operating unit, storing operation information related to operation of the operating unit, and sending the stored operation information to the recording control device in response to a request from the recording control device; and the recording control device requesting the operation information from the recording device, detecting second operation information by comparing the operation information received from the recording device to operation information previously received from the recording device and stored in the recording control device, and executing a communication test of the recording system when the second operation information is detected, Wherein, when the operating system of the recording control device starts, the recording control device requests the operation information at a regular interval.

4. The control method for a recording system described in claim 3, wherein:

the recording device is a printing device that forms images on the recording medium by a printhead, and executes a test printing operation using the printhead when the operation of the operating unit is detected.

* * * * *